Figure 1:
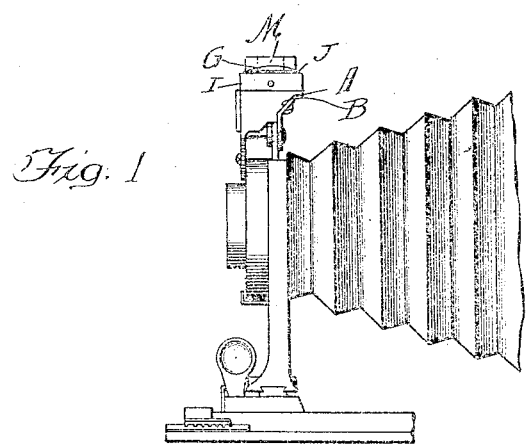
Figure 2:
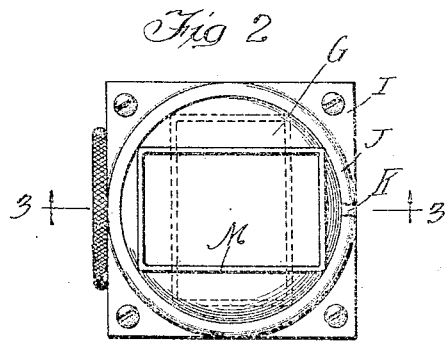
Figure 3:
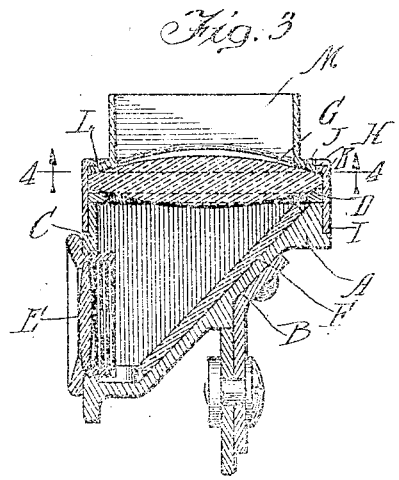
Figure 4:
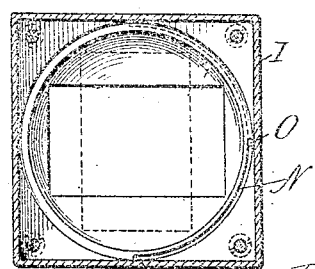
Figure 5:
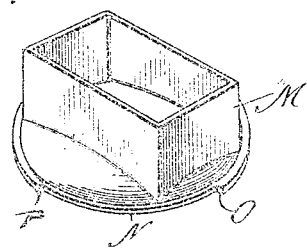
Figure 6:
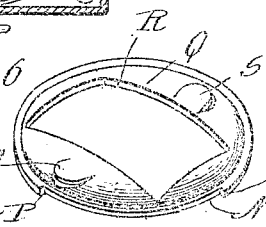

G. J. MacDOWELL.
FINDER ATTACHMENT FOR CAMERAS.
APPLICATION FILED NOV. 17, 1916.

1,293,149.

Patented Feb. 4, 1919.

Witnesses:
W. P. Kilroy
Harry R. Ashita

Inventor:
Glenn J. MacDowell

UNITED STATES PATENT OFFICE.

GLENN J. MacDOWELL, OF CHICAGO, ILLINOIS.

FINDER ATTACHMENT FOR CAMERAS.

1,293,149.         Specification of Letters Patent.         Patented Feb. 4, 1919.

Application filed November 17, 1916. Serial No. 131,949.

*To all whom it may concern:*

Be it known that I, GLENN J. MAC-DOWELL, citizen of the United States, residing at Chicago, in the county of Cook and State of Illinois, have invented certain new and useful Improvements in Finder Attachments for Cameras; and I do hereby declare the following to be a full, clear, and exact description of the invention, such as will enable others skilled in the art to which it appertains to make and use the same.

This invention has for its object to provide an attachment to the finder of a hand camera, or "kodak" as it is popularly termed, which will enable the operator to accurately determine the position of the picture on the plate or film disposed in the exposure plane of the camera.

In instruments of this class the exposure plane is generally oblong so that a picture may be taken lengthwise or crosswise of this area, the camera being positioned according to the desire of the operator to either take the picture lengthwise of the exposure area, or crosswise thereof.

The finder enables the operator to fix the position of the camera so that the objects which he desires to photograph will be positioned or focused as desired within the exposure area when the shutter is opened. Heretofore, however, the finders of cameras have not been so constructed as to enable the positions of such objects to be very positively fixed, especially those which would become disposed nearest the marginal edges of the exposure plane, so that frequently, for example, in photographing a group of persons it would happen that a person or persons at one end of a group would not be focused on the exposure plane, or on the other hand, in photographing high buildings it does not infrequently happen that the tops of the buildings are not focused on the exposure plane because of the difficulty of accurately positioning the camera by sighting the picture within a well-defined area through the finder.

The object of my present invention is to provide a turn-table associated with the finder, and having an opening the same shape as the exposure plane, and presenting substantially a miniature thereof, and providing means for enabling said plate or turn-table to be rotated so as to present the oblong opening in the plate in accordance with the position of the camera to focus pictures either longitudinally or transversely of the exposure plane, and within the boundaries of the latter by screening from the eye of the operator all portions of the view presented by the finder which would fall outside the exposure plane of the camera.

The invention consists in the features of construction and combinations of parts hereinafter fully described and claimed.

The invention in its preferred embodiment is illustrated in the accompanying drawings in which:

Figure —1— is a fragmentary detail view of the lens board carriage of a camera or kodak equipped with a finder constructed in accordance with the invention.

Fig. —2— is a top plan view of the finder showing the same equipped with a turn-table constructed in accordance with the invention.

Fig. —3— is a vertical longitudinal section on the line 3—3 of Fig. —2—.

Fig. —4— is a detail horizontal section on the line 4—4 of Fig. —3—.

Fig. —5— is a detail perspective view of the turn-table removed from the finder.

Fig. —6— is a view similar to Fig. —5— showing a modified form of construction.

The finder-housings of cameras of the class referred to are mounted to be swung through an arc of ninety degrees to position the visual lens thereof below the operator's head when the camera body is turned to photograph a view or object lengthwise and crosswise respectively, of the exposure-plane of the instrument, and it will be understood, of course, that my invention is adapted to finders of this type.

The finder comprises a housing A having a bottom wall B disposed at an angle of forty-five degrees to the front wall C and top wall D respectively, the latter being respectively vertically and horizontally disposed when the camera is normally positioned for photographing an object. In the front wall C there is mounted a lens E which focuses the picture upon a mirror F mounted on the bottom wall B of the finder-housing, and is reflected upwardly upon the lens G mounted upon or in the upper wall D of the housing. The operator of the instrument views the picture through which I will term the visual lens G. The said lens G has a sphero-convex upper face and is held between the plate indicated by the letter D, and the peripheral flange H of a sleeve I which telescopically receives the front, rear and side walls of the housing to which it is secured. The said flange H is circular and is provided with a circular bead J having a depression K thereon at one point.

Resting along its peripheral edge on the lens G is a dished plate L provided with a central oblong opening bordered by an oblong flange M which may be digitally engaged to rotate said plate. The peripheral edge of said plate L is provided with an arcuate recess N extending through an arc of about ninety degrees, and providing two shoulders O and P respectively, the latter of which is flush or in alinement with the long diameter of the opening bordered by the flange M, and the other of which is flush or in alinement with the short diameter of said opening.

As indicated in Fig. —2—, the said plate L may be turned through an arc of ninety degrees to present the opening in either of the two positions indicated in full and dotted lines respectively, the movement and position being determined by engagement of the shoulders O and P respectively, with the projection formed by the indentation K in the bead J of the plate or flange H. The body of the plate screens from the operator's view that portion of the picture which would fall outside the foundations of the exposure plane of the camera.

The flange M of the plate L may be omitted where the space in the camera housing is insufficient to permit the same to be used, and in such event the plate Q having a similar oblong opening R, and which is provided with projections S for digital engagement, may be substituted. The plate having the flange M is preferably employed for the reason that it enables the picture to be photographed to be more clearly seen by the operator.

The finder housing is, as usual, adapted to be swung through an arc of ninety degrees relatively to the lens-board so that as the camera is turned through a similar arc the lens G may be disposed below the eye of the operator. In turning the camera and the finder the operator must, of course, also manually turn the plate L so as to position the opening therein in accordance with the vertical or horizontal position of the exposure plane of the camera.

The advantages of this construction will be readily apparent. While I have shown the invention in its preferred embodiment, it is obvious, of course, that the construction may be varied without departing from the invention as defined in the appended claim.

I claim as my invention:

In a finder for photographic cameras, a rotatable plate mounted above the visual lens of the finder and having a central opening of the shape and proportions of the exposure plane of the camera and adapted to be rotated in accordance with either of the several positions of the exposure-plane to enable the operator to properly position the camera to focus the object to be photographed within the said exposure-plane, and an outwardly extending flange on said plate projecting from the margin of said opening said flange constituting a shade for rendering the view to be photographed clearly visible and affording means for manually rotating said plate to accord with the several positions of the exposure plane with relation to the view to be photographed.

In testimony whereof I have signed my name in presence of two subscribing witnesses.

GLENN J. MacDOWELL.

Witnesses:
 M. M. BOYLE,
 C. W. KINCH.